(12) United States Patent
Zhang et al.

(10) Patent No.: US 9,794,934 B2
(45) Date of Patent: Oct. 17, 2017

(54) METHOD AND SYSTEM FOR COMMUNICATING IN A WIRELESS MESH NETWORK

(71) Applicant: NXP B.V., Eindhoven (NL)

(72) Inventors: Yifeng Zhang, San Jose, CA (US); Tao Zhang, Beijing (CN); Tianbao Liang, Datong, CA (US); Shuchen Xie, Beijing (CN); Fuquan Zhang, Shenzhen (CN); Jianjun Zhang, Beijing (CN)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 14/682,040

(22) Filed: Apr. 8, 2015

(65) Prior Publication Data
US 2016/0302195 A1 Oct. 13, 2016

(51) Int. Cl.
*H04W 72/04* (2009.01)
*H04W 4/00* (2009.01)
*H04W 4/06* (2009.01)
*H04W 8/00* (2009.01)
*H04W 84/18* (2009.01)

(52) U.S. Cl.
CPC ....... *H04W 72/0446* (2013.01); *H04W 4/008* (2013.01); *H04W 4/06* (2013.01); *H04W 8/005* (2013.01); *H04W 84/18* (2013.01)

(58) Field of Classification Search
None
See application file for complete search history.

(56) References Cited

U.S. PATENT DOCUMENTS

| 5,719,868 A | 2/1998 | Young |
| 2009/0168703 A1 | 7/2009 | Pandey et al. |

(Continued)

FOREIGN PATENT DOCUMENTS

WO 2014077673 A1 5/2014

OTHER PUBLICATIONS

Extended European Search Report for Patent Appln. No. 16163915.8 (Aug. 25, 2016).

(Continued)

*Primary Examiner* — Robert C Scheibel
(74) *Attorney, Agent, or Firm* — Rajeev Madnawat

(57) ABSTRACT

Embodiments of a method for communicating in a wireless mesh network, a method for communicating in a Bluetooth Low Energy (BLE) mesh network, and a wireless communications device are described. In one embodiment, a method for communicating in a wireless mesh network involves at a first wireless communications device, scanning the wireless mesh network for a unit time period to discover a first transmission time slot within the unit time period that is used by a second wireless communications device in the wireless mesh network, at the first wireless communications device, choosing a second transmission time slot within the unit time period for the first wireless communications device, where the second transmission time slot is different from the first transmission time slot, and from the first wireless communications device, broadcasting data in the wireless mesh network in the second transmission time slot within a subsequent unit time period.

18 Claims, 11 Drawing Sheets

(56) References Cited

U.S. PATENT DOCUMENTS

| | | | |
|---|---|---|---|
| 2009/0168796 A1* | 7/2009 | Pandey | H04W 72/02 370/458 |
| 2010/0111048 A1* | 5/2010 | Shim | H04W 40/244 370/336 |
| 2015/0049644 A1* | 2/2015 | Lee | H04W 72/0446 370/256 |
| 2016/0088424 A1* | 3/2016 | Polo | H04W 84/18 455/41.1 |
| 2016/0269486 A1* | 9/2016 | Gupta | H04L 67/12 |

OTHER PUBLICATIONS

Tjensvold, J. M. "Comparison of the IEEE 802.11, 802.15.1, 802.15.4 and 802.15.6 wireless standards", 7 pgs. retrieve from the internet Aug. 12, 2016 at: https://janmagnet.files.wordpress.com/2008/07/comparison-ieee-802-standards.pdf (Sep. 18, 2007).

Jeon, H. "An Architecture for Mesh Networks and Some Related Issues", IEEE, 34 pgs. (Jul. 20, 2005).

* cited by examiner

METHOD AND SYSTEM FOR COMMUNICATING IN A WIRELESS MESH NETWORK

This disclosure relates to wireless mesh networks and methods and systems for communicating in a wireless mesh network.

A wireless mesh network can be used to facilitate communications between wireless communications devices. Typical wireless mesh networks include wireless communications devices that are wirelessly connected in a mesh topology.

Embodiments of a method for communicating in a wireless mesh network, a method for communicating in a Bluetooth Low Energy (BLE) mesh network, and a wireless communications device are described. In an embodiment, a method for communicating in a wireless mesh network involves, at a first wireless communications device, scanning the wireless mesh network for a unit time period to discover a first transmission time slot within the unit time period that is used by a second wireless communications device in the wireless mesh network, at the first wireless communications device, choosing a second transmission time slot within the unit time period for the first wireless communications device, and from the first wireless communications device, broadcasting data in the wireless mesh network in the second transmission time slot within a subsequent unit time period. In an embodiment, the unit time period is divided into transmission time slots to be used by wireless communications devices in the wireless mesh network, the second wireless communications device is located within the communications range of the first wireless communications device, and the second transmission time slot is different from the first transmission time slot. Other embodiments are also described.

In an embodiment, the method for communicating in the wireless mesh network further involves, from the first wireless communications device, transmitting a request to join the wireless mesh network to the second wireless communications device in a transmission time slot reserved for joining the wireless mesh network or the second transmission time slot within a second subsequent unit time period, before broadcasting data in the wireless mesh network from the first wireless communications device in the second transmission time slot within the subsequent unit time period.

In an embodiment, the method for communicating in the wireless mesh network further involves, at the first wireless communications device, receiving a confirmation message from the second wireless communications device in the first transmission time slot within a second subsequent unit time period that confirms the usage of the second transmission time slot by the first wireless communications device, before broadcasting the data in the wireless mesh network from the first wireless communications device in the second transmission time slot within the subsequent unit time period.

In an embodiment, the method for communicating in the wireless mesh network further involves, at the first wireless communications device, choosing a third transmission time slot within each unit time period for the first wireless communications device before choosing the second transmission time slot within each unit time period for the first wireless communications device, where the third transmission time slot is different from the first and second transmission time slots, and, at the first wireless communications device, receiving a message from the second wireless communications device in the first transmission time slot within a second subsequent unit time period that objects to the usage of the third transmission time slot by the first wireless communications device.

In an embodiment, at the first wireless communications device, scanning the wireless mesh network for the unit time period, involves, at the first wireless communications device, creating a neighbor table that identifies the second wireless communications device and the first transmission time slot that is used by the second wireless communications device.

In an embodiment, at the first wireless communications device, choosing the second transmission time slot within the unit time period for the first wireless communications device involves, at the first wireless communications device, generating a random number that corresponds to a place of the second transmission time slot within each unit time period.

In an embodiment, at the first wireless communications device, scanning the wireless mesh network for the unit time period, involves, at the first wireless communications device, receiving signals in the wireless mesh network at a first frequency band. From the first wireless communications device, broadcasting data in the wireless mesh network, involves, from the first wireless communications device, transmitting signals in the wireless mesh network in a second frequency band, and where the first frequency band does not overlap with the second frequency band.

In an embodiment, the method for communicating in the wireless mesh network further involves, at the first wireless communications device, receiving a data packet from the second wireless communications device in the first transmission time slot within a second subsequent unit time period, and, from the first wireless communications device, transmitting the received data packet in the wireless mesh network in the second transmission time slot within the second subsequent unit time period or a third subsequent unit time period.

In an embodiment, the wireless mesh network is a peer-to-peer network.

In an embodiment, a method for communicating in a Bluetooth Low Energy (BLE) mesh network involves, at a first BLE compatible device, scanning the BLE mesh network for a unit time period to discover a first transmission time slot within the unit time period that is used by a second BLE compatible device in the BLE mesh network, at the first BLE compatible device, choosing a second transmission time slot within the unit time period for the BLE compatible device, and from the first BLE compatible device, broadcasting data in the BLE mesh network in the second transmission time slot within a subsequent unit time period. In an embodiment, the unit time period is divided into transmission time slots to be used by BLE compatible devices in the BLE mesh network, the second BLE compatible device is located within the communications range of the first BLE compatible device, and the second transmission time slot is different from the first transmission time slot.

In an embodiment, the method for communicating in the BLE mesh network further involves, from the first BLE compatible device, transmitting a request to join the BLE mesh network to the second BLE compatible device in a transmission time slot reserved for joining the BLE mesh network or the second transmission time slot within a second subsequent unit time period, before broadcasting data in the BLE mesh network from the first BLE compatible device in the second transmission time slot within the subsequent unit time period.

In an embodiment, the method for communicating in the BLE mesh network further involves, at the first BLE compatible device, receiving a confirmation message from the second BLE compatible device in the first transmission time slot within a second subsequent unit time period that confirms the usage of the second transmission time slot by the first BLE compatible device, before broadcasting the data in the BLE mesh network from the first BLE compatible device in the second transmission time slot within the subsequent unit time period.

In an embodiment, the method for communicating in the BLE mesh network further involves, at the first BLE compatible device, choosing a third transmission time slot within each unit time period for the first BLE compatible device before choosing the second transmission time slot within each unit time period for the first BLE compatible device, where the third transmission time slot is different from the first and second transmission time slots, and, at the first BLE compatible device, receiving a message from the second BLE compatible device in the first transmission time slot within a second subsequent unit time period that objects to the usage of the third transmission time slot by the first BLE compatible device.

In an embodiment, at the first BLE compatible device, scanning the BLE mesh network for the unit time period, involves, at the first BLE compatible device, creating a neighbor table that identifies the second BLE compatible device and the first transmission time slot that is used by the second BLE compatible device.

In an embodiment, at the first BLE compatible device, choosing the second transmission time slot within the unit time period for the first BLE compatible device involves, at the first BLE compatible device, generating a random number that corresponds to a place of the second transmission time slot within each unit time period.

In an embodiment, at the first BLE compatible device, scanning the BLE mesh network for the unit time period, involves, at the first BLE compatible device, receiving signals in the BLE mesh network at a first frequency band. From the first BLE compatible device, broadcasting data in the BLE mesh network, involves, from the first BLE compatible device, transmitting signals in the BLE mesh network in a second frequency band, and where the first frequency band does not overlap with the second frequency band.

In an embodiment, the method for communicating in the BLE mesh network further involves, at the first BLE compatible device, receiving a data packet from the second BLE compatible device in the first transmission time slot within a second subsequent unit time period, and, from the first BLE compatible device, transmitting the received data packet in the BLE mesh network in the second transmission time slot within the second subsequent unit time period or a third subsequent unit time period.

In an embodiment, the BLE mesh network is a peer-to-peer network.

In an embodiment, a wireless communications device includes an antenna module configured to receive radio frequency (RF) signals or transmit RF signal and a transceiver module configured to scan a wireless mesh network for a unit time period to discover a first transmission time slot within the unit time period that is used by a second wireless communications device in the wireless mesh network, choose a second transmission time slot within the unit time period for the wireless communications device, and broadcast data in the wireless mesh network in the second transmission time slot within a subsequent unit time period.

In an embodiment, the unit time period is divided into transmission time slots to be used by wireless communications devices in the wireless mesh network, the second wireless communications device is located within the communications range of the wireless communications device, and the second transmission time slot is different from the first transmission time slot.

In an embodiment, the transceiver module is further configured to transmit a request to join the wireless mesh network to the second wireless communications device in a transmission time slot reserved for joining the wireless mesh network or the second transmission time slot within a second subsequent unit time period.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
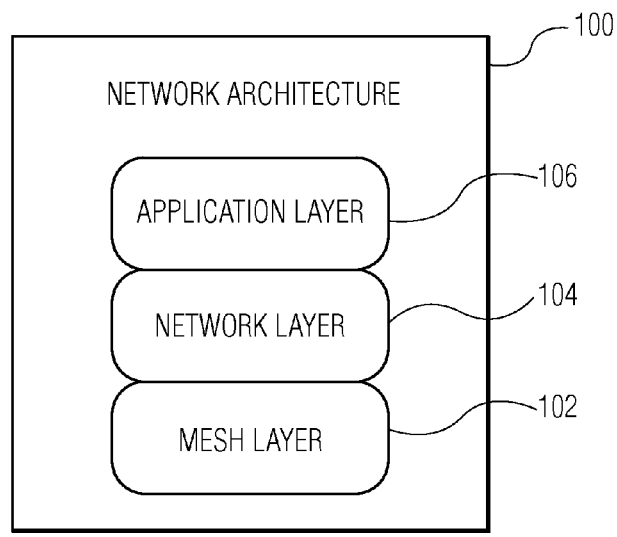
FIG. 1 depicts a network architecture of a wireless mesh network.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

In a typical wireless mesh network such as a flood routing based mesh network, each communications device continuously scans/listens to the communications channel for signals from other communications devices in the wireless mesh network in order to avoid communications collisions and to perform data relay. However, continuous channel scanning increases power consumption of the communications devices. For a battery-powered communications device, continuous channel scanning leads to quick depletion of battery power, which can disable the non-communication (e.g., sensing/alarming) function of the battery-powered communications device.

A wireless mesh network can be used to facilitate communications between wireless communications devices. Based on the network topology, a wireless mesh network can be categorized as a static mesh network, a semi-static mesh network, or a dynamic mesh network. In a static mesh network, the physical positions/locations of all communications devices/nodes are fixed such that the topological structure of the static mesh network is relatively stable. An example of a static mesh network is a smart home network that is composed of stationary devices, such as lights with Bluetooth Low Energy (BLE) communications capabilities. In a semi-static mesh network, different from a static mesh network, some communications devices/nodes may slowly move such that the topological structure of the semi-static mesh network may change. For example, if a patient in a hospital has a BLE smart band that is part of a semi-static hospital mesh network, the real-time record of the patient's health condition can be monitored through the hospital mesh network, even when the patient moves within the hospital. In a dynamic mesh network, many communications devices/nodes are moving and the topological structure of the dynamic mesh network continuously changes. For example, if a group of friends with smart phones that form a temporary dynamic mesh network attends a party, a person can communicate/talk with others in the group via the temporary dynamic mesh network.

In some embodiments, within a wireless mesh network, a communications device can act as a controller or a router. A controller is a communications device, such as a cellular phone, which acts as a control unit for the wireless mesh network. A router is a communications device that is responsible for associating and disassociating devices into the wireless mesh network.

FIG. 1 depicts a network architecture 100 of a wireless mesh network. As shown in FIG. 1, the network architecture of the wireless mesh network includes a mesh layer 102, a network layer 104 on top of the mesh layer, and an application layer 106 on top of the network layer. The network layer communicates with the application and mesh layers. The network layer provides routing and control function to the application layer. The network layer uses the mesh layer to transmit signal commands in the network layer and provides an interface to the application layer.

Figure 2:
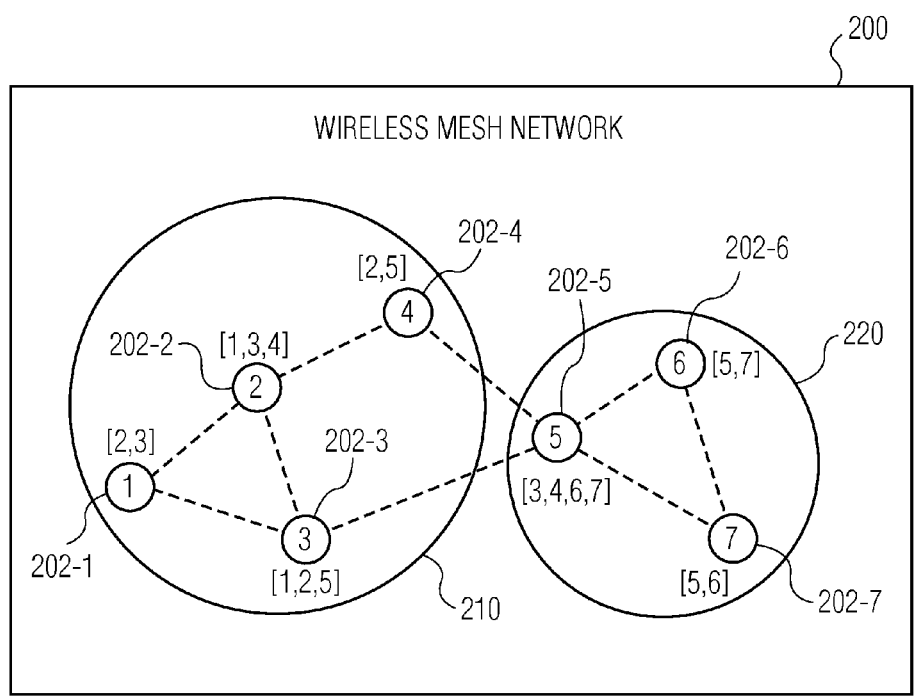
FIG. 2 depicts an example network topology of a wireless mesh network.

FIG. 2 depicts an example network topology of a wireless mesh network 200. As shown in FIG. 2, the wireless mesh network includes seven wireless communications devices/nodes 202-1, 202-2, 202-3, 202-4, 202-5, 202-6, 202-7, which are also labeled as wireless communications devices/nodes "1", "2", "3", "4", "5", "6", "7". The wireless devices can wirelessly communicate using radio frequency (RF) communications signals. Examples of the wireless devices include (without being limited to) handheld wireless devices, such as cell phones, mobile phones, smartphones, pad computers, Personal Digital Assistants (PDAs), handheld gaming devices etc, and embedded wireless devices, such as light switches, alarm controllers, and wireless sensors. A wireless device can support various different RF communications protocols, including without limitation, Bluetooth (e.g., Bluetooth low energy (Bluetooth LE, BLE, or Bluetooth Smart), WiFi (802.11), Global System for Mobile communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols. In addition, although the wireless mesh network is shown in FIG. 2 as including seven wireless communications devices, in other embodiments, the wireless mesh network may include less than seven wireless communications devices or more than seven wireless communications devices. In a typical implementation, the wireless mesh network includes tens of or hundreds of wireless communications devices.

Wireless communications devices 202 that can "hear" each other in the wireless mesh network 200 without an intermediate communications device are referred to as neighbors/neighboring wireless communications devices. For a wireless communications device, any wireless communications device within its communication range (e.g., RF communications range) is considered a device that can "hear" another device and is thereafter a neighbor or a neighboring wireless communications device of the wireless communications device. For example, wireless communications devices 202-1, 202-3, and 202-4 are neighbors of the wireless communications device 202-2 while wireless communications devices 202-3, 202-4, 202-6, and 202-7 are neighbors of the wireless communications device 202-5. A wireless communications device can only directly communicate with its neighbors in the wireless mesh network. For example, the wireless communications device 202-2 can only directly receive signals from or transmit signals to the wireless communications devices 202-1, 202-3, and 202-4 while the wireless communications devices 202-3, 202-4, 202-6, and 202-7 can only directly receive signals from or transmit signals to the wireless communications device 202-5. As shown in FIG. 2, each wireless communications device in the wireless mesh network maintains a neighbor table that identifies all of neighbors/neighboring wireless communications devices of that communications device. For example, the wireless communications device 202-1 has a neighbor table [2, 3] that identifies its neighbor communications devices 202-2, 202-3, the wireless communications device 202-2 has a neighbor table [1, 3, 4] that identifies its neighbor communications devices 202-1, 202-3, 202-4, the wireless communications device 202-3 has a neighbor table [1, 2, 5] that identifies its neighbor communications devices 202-1, 202-2, 202-5, the wireless communications device 202-4 has a neighbor table [2, 5] that identifies its neighbor communications devices 202-2, 202-5, the wireless communications device 202-5 has a neighbor table [3, 4, 6, 7] that identifies its neighbor communications devices 202-3, 202-4, 202-6, 202-7, the wireless communications device 202-6 has a neighbor table [5, 7] that identifies its neighbor communications devices 202-5, 202-7, and the wireless communications device 202-7 has a neighbor table [5, 6] that identifies its neighbor communications devices 202-5, 202-6.

In some embodiments, the wireless mesh network 200 utilizes time-division-multiplexing (TDM) and is referred to as a time-division network. In these embodiments, a different transmission time slot within a unit time period is used by each wireless communications device 202 in a certain area of the wireless mesh network 200. Compared to a typical wireless mesh network in which communications devices continuously scan/listen for signals from other communications devices in the wireless mesh network, using different transmission time slots for different communications devices can reduce power consumption due to continuous channel scanning/listening as well as data transmission collision. Compared to a typical wireless mesh network in which communications devices continuously scan/listen for signals from other communications devices in the wireless mesh network, using different transmission time slots for different communications devices allows a communications device to selectively receive signals from other communications devices in the wireless mesh network and reduces power consumption that is caused by continuous channel scanning/listening. Consequently, the operating duration/life of battery-powered wireless mesh devices can be extended. In addition, because a communications device is aware of the data transmission time/schedule of its neighbor communication devices, data transmission collisions can be reduced.

Figure 3A:
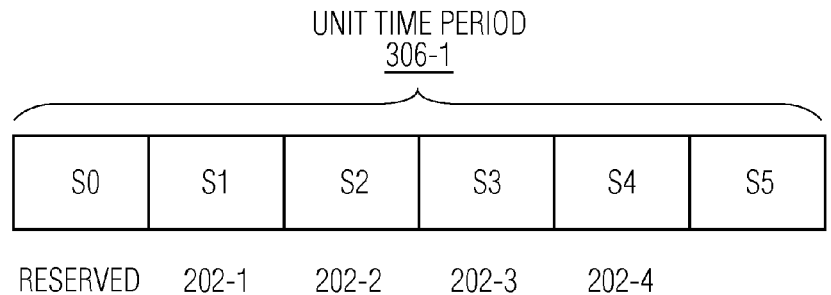
FIG. 3A is an example transmission time slot diagram for an area of the wireless mesh network shown in FIG. 2.
Figure 3B:
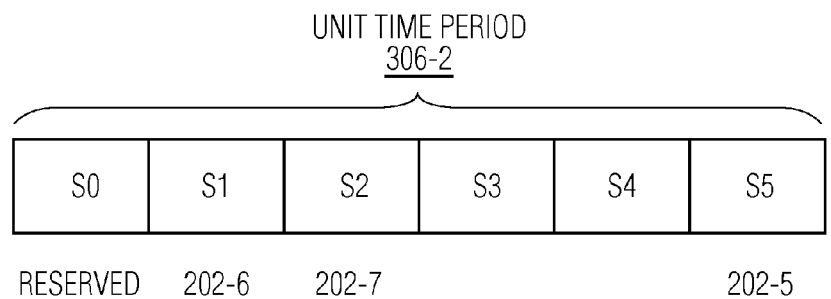
FIG. 3B is an example transmission time slot diagram for another area of the wireless mesh network shown in FIG. 2.

In an embodiment, a wireless communications device 202 and all of its neighbor wireless communication devices in the wireless mesh network 200 use different transmission time slots within each unit time period. FIG. 3A is an example transmission time slot diagram for an area 210 of the wireless mesh network shown in FIG. 2. For example, with reference to FIG. 3A, the wireless communications device 202-2 and its neighbor communications devices 202-1, 202-3, 202-4 may use the transmission time slots S-2, S-1, S-3, S-4, respectively, within each unit time period 306-1 that includes the transmission time slots S-1, S-2, S-3, S-4, another transmission time slot S-5, and a transmission time slot S-0 that is used for a new communications device trying to join the wireless mesh network. FIG. 3B is an example transmission time slot diagram for an area 220 of the wireless mesh network shown in FIG. 2. With reference to FIG. 3B, the wireless communications device 202-5 may use the transmission time slot S-5 within each unit time period 306-2 while the wireless communications devices 202-6, 202-7 may use the transmission time slots S-1, S-2 within each unit time period. Although the wireless communications devices 202-6, 202-7 use the same transmission time slots as the wireless communications devices 202-1 and 202-2, the physical separation between these wireless communications devices prevents data transmission collisions. For example, the communication range of the wireless communications devices 202-1 and 202-2 does not cover the wireless communications devices 202-6 and 207, and the communication range of the wireless communications devices 202-6 and 202-7 does not cover the wireless communications devices 202-1 and 202-2. In some embodiments, randomness (e.g., a random transmission start point within a transmission time slot) can be introduced into packet transmission to avoid collision. A unit time period can be any suitable time duration, e.g., 1, 2, 5, or 10 milliseconds. In an embodiment, a unit time period is dependent upon the desired network capacity (e.g., the maximum number of unique devices that can be accommodated in the wireless mesh network and/or the number of wireless communications devices in the wireless mesh network. For example, a unit time period may include time slots for half or a quarter of the expected number of wireless communications devices in the wireless mesh network. For a wireless mesh network with 100 wireless communications devices, a unit time period (e.g., 5 milliseconds) includes 50 time slots of equal time duration (e.g., 0.1 millisecond). In some embodiments, the number of time slots in each unit time period can be dynamically adjusted, for example, based on the changes in the network capacity and/or network performance of the wireless mesh network.

Figure 3C:
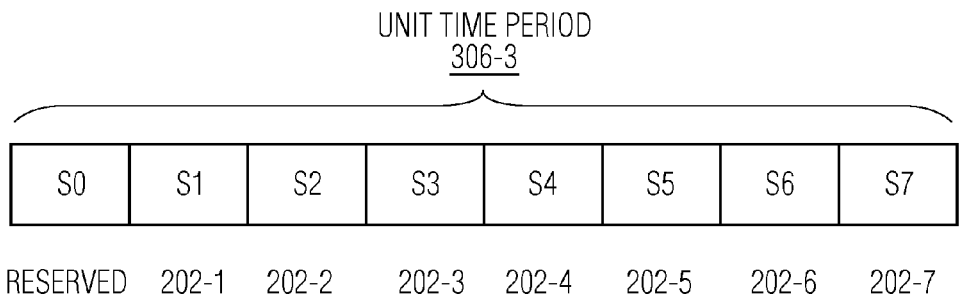
FIG. 3C is an example transmission time slot diagram for the wireless mesh network shown in FIG. 2.

In some embodiments, each wireless communications device 202 in the wireless mesh network 200 utilizes a different transmission time slot within a unit time period. FIG. 3C is an example transmission time slot diagram for the wireless mesh network 200 shown in FIG. 2. For example, with reference to FIG. 3C, the wireless communications devices 202-1, 202-2, 202-3, 202-4, 202-5, 202-6, 202-7 use the transmission time slots S-1, S-2, S-3, S-4, S-5, S6, S7, respectively, within a unit time period 306-3 that includes the transmission time slots S-1, S-2, S-3, S-4, S-5, S6, S7, and a transmission time slot S-0 that is reserved for a new communications device trying to join the wireless mesh network.

In some embodiments, transmission time slots are chosen by communications devices 202 that are trying to join the wireless mesh network. The chosen transmission time slots can be confirmed by other communications devices in the wireless mesh network. In some embodiments, transmission time slots are allocated or assigned to communications devices in the wireless mesh network.

Figure 4:
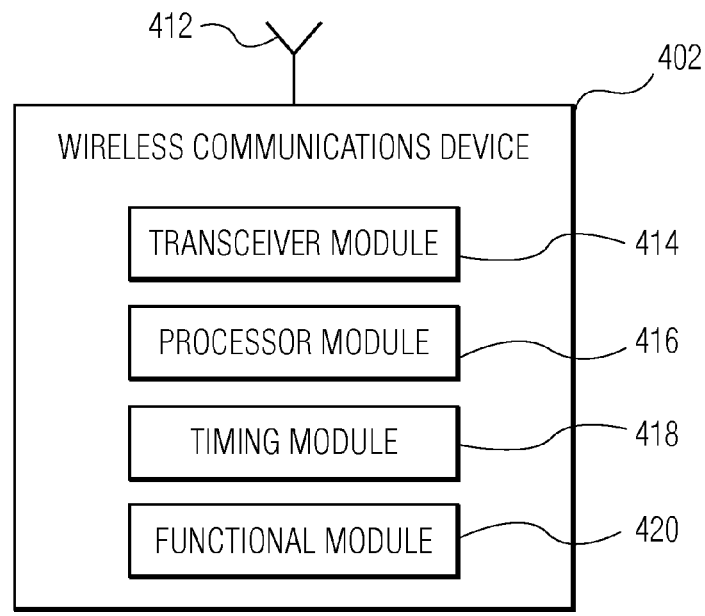
FIG. 4 is a schematic block diagram of a wireless communications device in accordance with an embodiment of the invention.

FIG. 4 is a schematic block diagram of a wireless communications device, such as the wireless communications devices 202-1, 202-2, 202-3, 202-4, 202-5, 202-6, or 202-7 depicted in FIG. 2 in accordance with an embodiment of the invention. In the embodiment depicted in FIG. 4, a wireless communications device 402 includes an antenna module 412, a transceiver module 414, a processor module 416, a timing module 418, and a functional module 420. The wireless communications device depicted in FIG. 4 is one possible embodiment of the wireless communications devices depicted in FIG. 2. However, the wireless communications devices depicted in FIG. 2 are not limited to the embodiment shown in FIG. 4.

The antenna module 412 of the wireless communications device 402 is configured to receive RF signals and to transmit RF signals. The transceiver module 414 of the wireless communications device is configured to demodulate received RF signals and to modulate RF signals to be transmitted. The processor module 416 of the wireless communications device is configured to process received signals and to perform management functions, such as selecting a transmission time slot for the wireless communications device. The processor module may include a central processing unit (CPU). In certain embodiments, the processor module executes software or firmware stored in memory. The memory may be or may include random access memory (RAM), read-only memory (ROM), flash memory, or the like, or a combination of such devices and may include the main memory of the computer system. The processor module may be, or may include, one or more programmable general-purpose or special-purpose microprocessors, digital signal processors (DSPs), application specific integrated circuits (ASICs), programmable controllers, programmable logic devices (PLDs), or the like, or a combination of such devices. The timing module 418 of the wireless communications device is configured to provide a clock signal for the transceiver module and the processor module. The timing module may be a clock source or other timing device. The functional module 420 of the wireless communications device is configured to perform a certain function (such as controlling an alarm, controlling a light switch, and sensing). The functional module may be a controller (e.g., an alarm controller, a light controller) or a sensor (e.g., a light sensor, a temperature sensor, a humidity sensor). In some embodiments, the wireless communications device does not include the timing module and/or the functional module.

Figure 5:
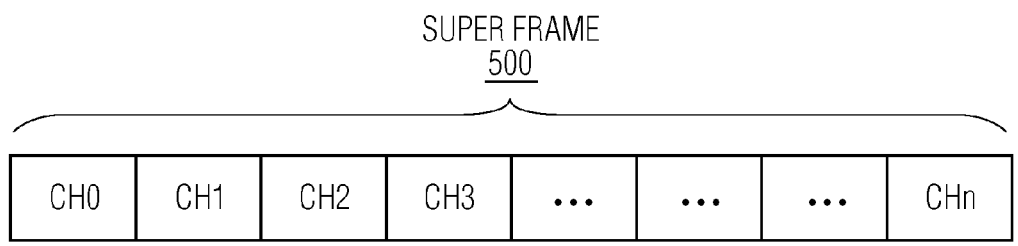
FIG. 5 depicts a super frame that includes advertising time slots.

In an embodiment, the wireless communications device 402 sends data by advertising and receives data by scanning To prevent advertising interference, advertising time slots/channels can be reserved for each communications device in the wireless mesh network 200. FIG. 5 depicts a super frame 500 that includes advertising time slots. As shown in FIG. 5, the super frame, which is a logical structure, is divided into n advertising time slots/channels, CH0, CH1, CH2, CH3, . . . , CHn, where n is a positive integer that is greater than 1. Each of the channels CH1, CH2, CH3, . . . , CHn is used by a different wireless communications device in the wireless mesh network. Channel CH0 is used as a control channel to deal with some common events such as a new communications device joining the wireless mesh network.

In some embodiments, the process for building the wireless mesh network 200 is divided into three stages, which includes a discovery stage, a join stage, and an association stage. Before a wireless communications device/node 202 joins the wireless mesh network 200, the wireless communications device/node 202 scans the wireless mesh network for one or more unit time periods to find neighbor wireless communications devices/nodes and to create a neighbor table according to the scan result during the discovery stage.

Figure 6:
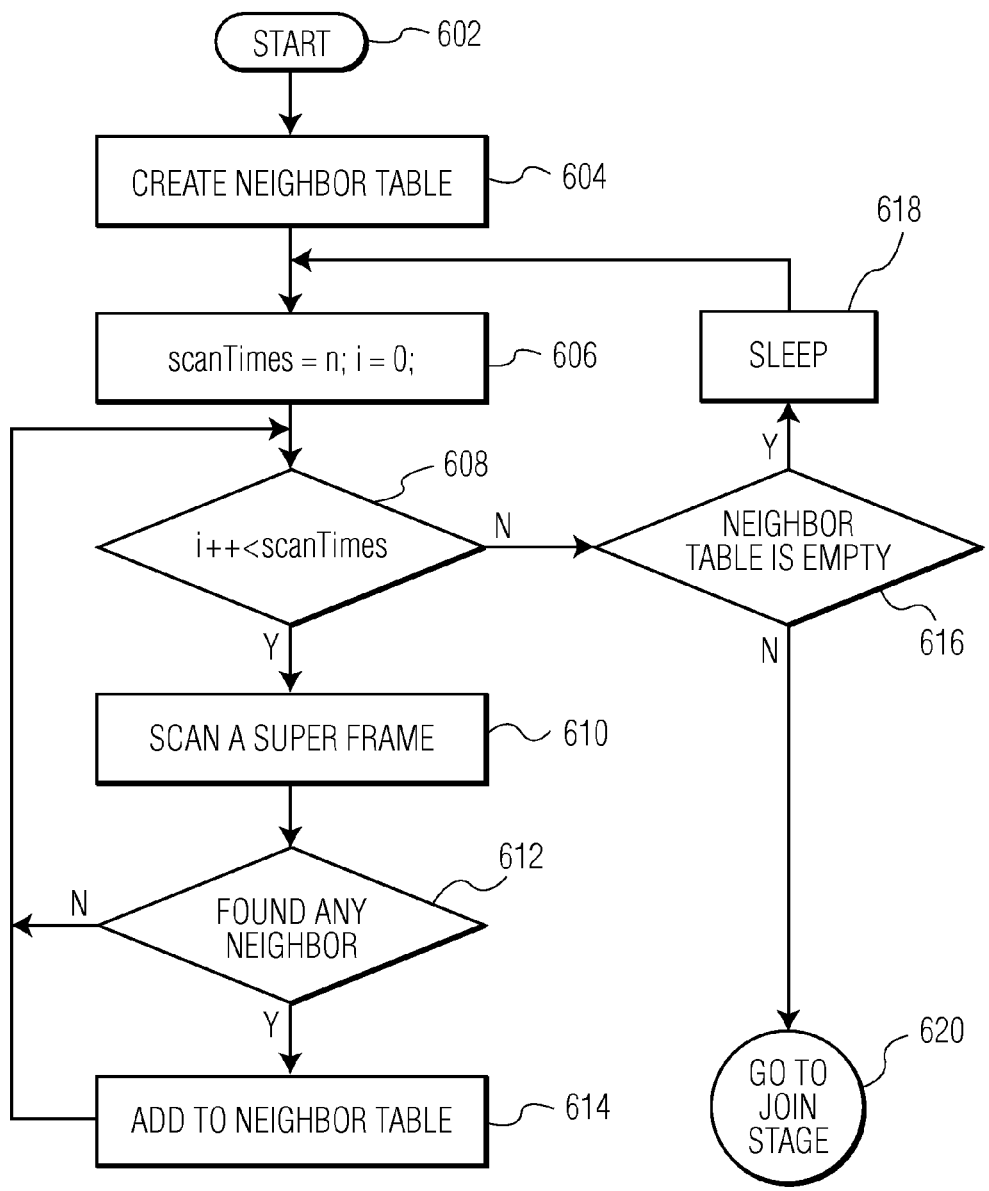
FIG. 6 is a flow chart that illustrates a discovery stage for a wireless communications device.

FIG. 6 is a flow chart that illustrates a discovery stage for a wireless communications device 202 or 402. The wireless communications device begins operation, at step 602. At step 604, the wireless communications device creates a neighbor table, which may be an empty neighbor table. After the neighbor table is created, the wireless communications device begins to scan the wireless mesh network 200 for neighbor wireless communications devices (e.g., listen to the wireless mesh network for one or more unit time periods to discover neighbor wireless communications devices and the transmission time slots within each unit time period used by the discovered neighbor wireless communications devices) and sets the current number, "i," of channel/time slot scans to zero and n equal to a predefined range, "scanTimes" (which limits/controls the amount of scans to manage battery power usage), at step 606. The wireless communications device checks whether or not the current number, i, of channel scans exceeds the predefined range, "scanTimes," (i.e., whether or not the channel scan procedure is finished), at step 608. If the current number, i, of channel scans is below/less than the predefined range, scanTimes, the wireless communications device scans the wireless mesh network 200 for neighbor wireless communications devices, at step 610. The wireless communications device checks whether or not any neighbor wireless communications device is found, at step 612. If a neighbor wireless communications device is found, the wireless communications device adds the neighbor wireless communications device and the transmission time slot used by the neighbor wireless communications device to the neighbor table, at step 614. If no neighbor wireless communications device is found, the wireless communications device returns to step 608. If the current number, i, of channel scan is equal to or greater than the predefined range, scanTimes, the wireless communications device checks whether or not the neighbor table is empty, at step 616. If the neighbor table is empty, the wireless communications device enters a sleep mode for a time duration, at step 618, and the process go back to step 606. If the neighbor table is not empty, the wireless communications device enters the join stage to join the wireless mesh network, at step 620.

During the join stage, a wireless communications device 202 chooses a proper time slot/channel according to neighbor table, sends a "Join Request Packet" within a control time slot channel or the selected time slot/channel to request to join the wireless mesh network 200. Once a 'Join Response packet' is received, the wireless communications device successfully joins the wireless mesh network. Otherwise, the wireless communications device returns to the discovery stage.

Figure 7:
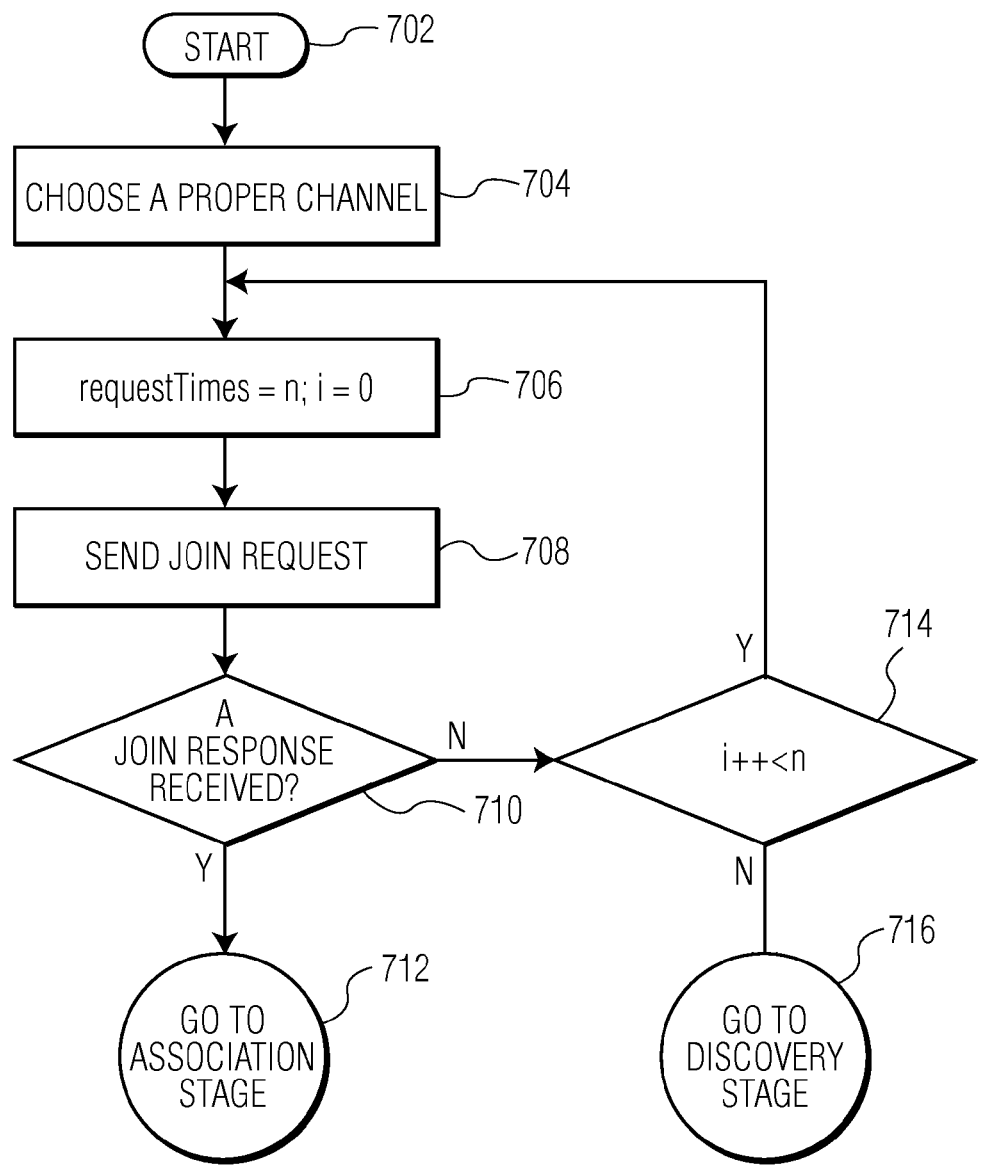
FIG. 7 is a flow chart that illustrates a join stage for a wireless communications device.

FIG. 7 is a flow chart that illustrates a join stage for a wireless communications device 202 or 402. The wireless communications device begins operation, at step 702. At step 704, the wireless communications device chooses a proper transmission time slot/channel. For example, a proper transmission time slot/channel is chosen based on the neighbor table created during the discovery stage. If the neighbor table shows one or more neighbor communication devices, the wireless communications device chooses a transmission time slot within each unit time period that is different from the transmission time slot(s) used by the neighbor communication devices in the wireless mesh network 200. For example, the wireless communications device generates a random number that corresponds to the desired transmission time slot within a unit time period. If the neighbor table shows no neighbor communication device, the wireless communications device chooses a transmission time slot within a unit time period, which can be any transmission time slot within the unit time period, except a time slot that has been used/reserved transmission time slot for some other purpose such as control communicating. After the time slot/channel is selected, the wireless communications device sets the current number, "i," of join request(s) to zero and n equal to a predefined range, "requestTimes" (e.g., which keeps the wireless communication device from continuously sending join requets and exhausting battery power), at step 706, and sends/broadcasts a join request to the wireless mesh network, at step 708. The wireless communications device checks whether or not a join response is received, at step 710. Receipt of a join response confirms the usage of the transmission time slot by the wireless communications device. If a join response is received (e.g., within a certain time limit as controlled by n), the wireless communications device goes to the association stage, at step 712. If no join response is received (e.g., within a certain time limit as controlled by n), the wireless communications device checks whether the current number, i, of join requests is less than the predefined range, "requestTimes," at step 714. If the current number, i, of join requests is less than the predefined range, requestTimes, the process goes back to step 706. If the current number, i, of join requests is greater than or equal to the predefined range, requestTimes, the process goes back the discovery stage, at step 716.

During the associate stage, a wireless communications device 202 performs the functions of a member of the wireless mesh network 200 and handles join requests/routing requests/data packets from wireless neighbor communications devices in the wireless mesh network.

Figure 8:
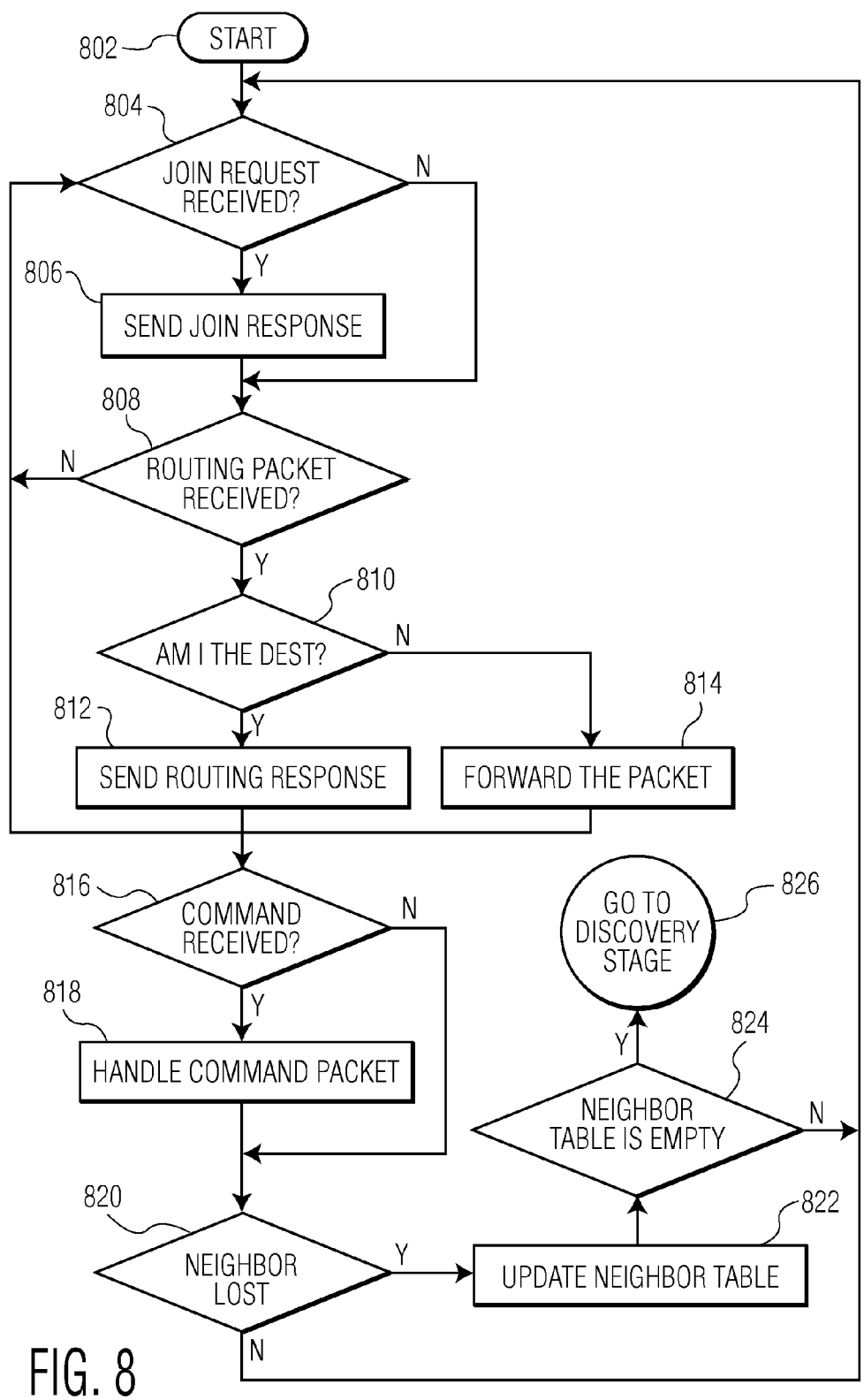
FIG. 8 is a flow chart that illustrates an associate stage for a wireless communications device.

FIG. 8 is a flow chart that illustrates an associate stage for a wireless communications device 202 or 402. The wireless communications device begins operation, at step 802. At step 804, the wireless communications device checks whether or not a join request from a neighbor communications device in the wireless mesh network 200 is received. If a join request is received (e.g., within a certain time limit), the wireless communications device sends a join response at step 806, assuming the chosen transmission time slot in the join request is unused by other wireless communications devices within the communications range of a wireless communications device trying to join the wireless mesh network. If the chosen transmission time slot in the join request is already used by another wireless communications device, the wireless communications device sends a message, which objects to the usage of the chosen transmission time slot, to the wireless communications device trying to join the wireless mesh network. After the join response is sent, the wireless communications device checks whether or not a routing packet is received, at step 808. If no join request is received (e.g., within a certain time limit), the process also goes to step 808. If no routing packet is received (e.g., within a certain time limit), the process goes back to step 804. If a routing packet is received (e.g., within a certain time limit), the wireless communications device checks whether or not it is the destination of the data packet, at step 810. If the wireless communications device is the destination of the data packet, the wireless communications device sends/broadcasts a routing response (e.g., an acknowledgement packet that confirms the receipt of the data packet at its intended destination), at step 812. If the wireless communications device is not the destination of the data packet, the wireless communications device forwards the packet to other communications devices, at step 814, and the process goes back to step 804. After the routing response is sent, the wireless communications device checks whether or not the received data packet is a command packet, at step 816. If the received data packet is a command packet, the wireless communications device processes the command packet, at step 818. If the received data packet is not a command packet or after the wireless communications device processes the command packet, the wireless communications device checks whether or not a neighbor communications device is lost (e.g., no longer reachable), at step 820. If no neighbor communications device is lost, the process goes back to step 804. If a neighbor communications device is lost, the wireless communications device updates its neighbor table to remove the lost neighbor communications device, at step 822, and checks whether or not the neighbor table is empty, at step 824. If the neighbor table is empty, the wireless communications device goes to the discovery stage, at step 826. If the neighbor table is not empty, the wireless communications device goes back to step 824.

Figure 9:
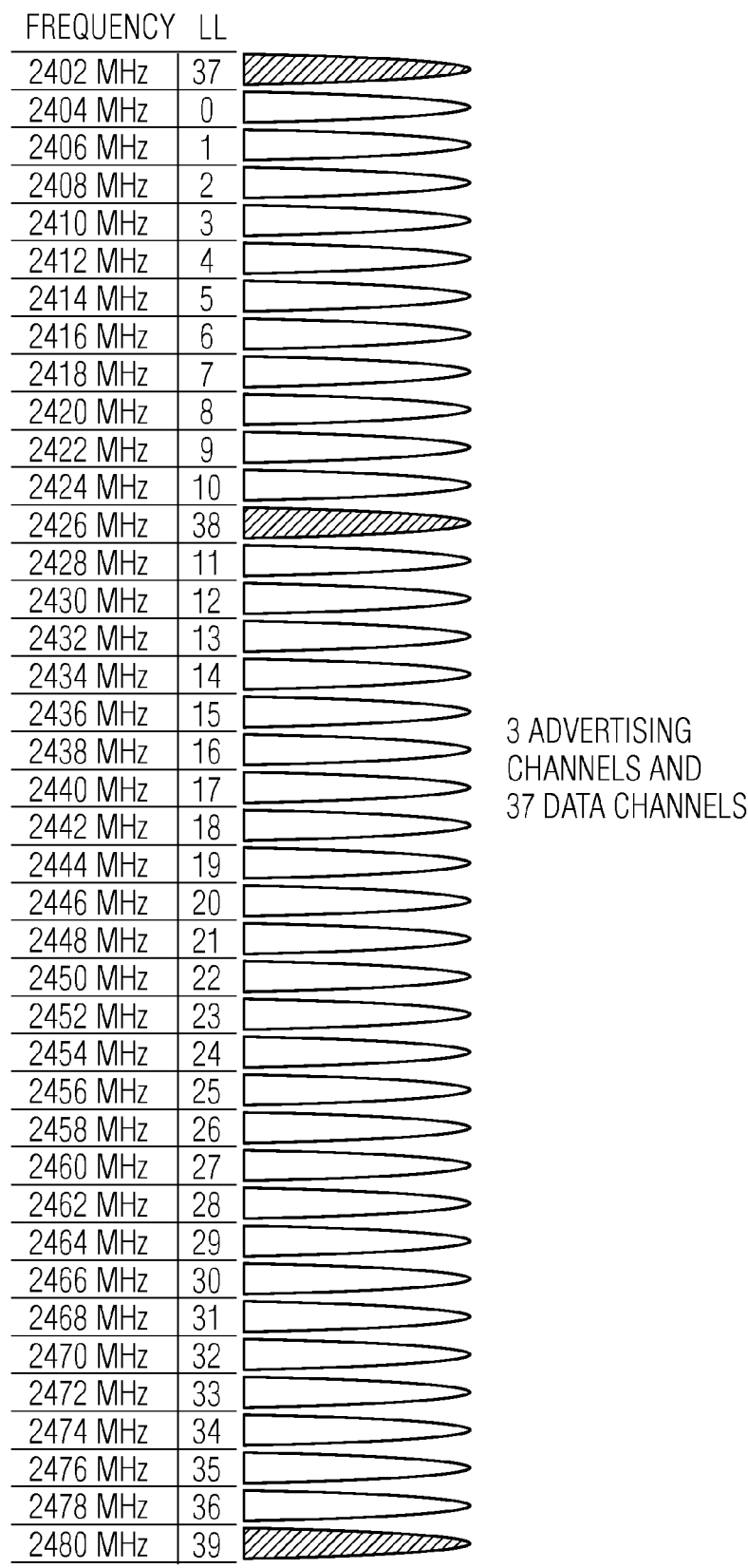
FIG. 9 shows advertising frequency channels and data channels that can be used in a BLE mesh network.

The frequency band in which a wireless communications device 202 scans the wireless mesh network 200 is typically the same as or at least partially overlaps with the frequency band in which the wireless communications device 202 transmits data (e.g., data packet carrying payload). However, in some embodiments, the frequency band in which a wireless communications device scans the wireless mesh network is different from (e.g., does not overlap with) the frequency band in which the wireless communications device transmits data (e.g., data packet carrying payload). For example, a Bluetooth Low Energy (BLE) device scans a BLE mesh network in an advertising frequency channel to find neighbor BLE devices, and subsequently, transmits or broadcasts data packets carrying a data payload in a data frequency channel. FIG. 9 shows three advertising frequency channels and thirty-seven data channels that can be used in a BLE mesh network.

Table 1 shows an example of a command packet passed between two wireless communications devices 202. As shown in Table 1, the command packet includes a service data section, a service identification number (UUID) section, and a mesh signal command section. All commands are sent via advertising packets and received by scanning According to the format of Advertising data, a network layer packet is encapsulated into service data AD type.

TABLE 1

| Command Packet | | |
|---|---|---|
| Octets: 1 Byte | 2 | N |
| Service data(0x16) | Service UUID | Mesh Signal command |

A report command allows a wireless communications device 202 to report its own status and information to a neighbor wireless communications device. Table 2 shows an example of a report command packet.

TABLE 2

| Report Command Packet | | | | |
|---|---|---|---|---|
| Octets: 1 Byte | 1 | 1 | 1 | 10 |
| opcode = 0x01 | Src Network Address | Channel ID | ACK_ID | Network layer payload |

As shown in Table 2, the format of the Report Command packet includes the following data fields:
Src (source) Network Address
This field describes the local device network address used in the wireless mesh network 200.
Channel ID
The channel ID is the channel index in the transmission time slot.
ACK_id (Acknowledgement ID)
At join stage, the ACK_id must match with the same field of the join request.
Payload
Network layer payload.

Table 3 shows an example of a Join Request packet, which is used by a wireless communications device 202 trying to join the wireless mesh network 200.

TABLE 3

Join Request Packet

| Octets: 1 Byte | 1 | 1 | 1 | 1 | 1 | 3 |
|---|---|---|---|---|---|---|
| Opcode = 0x02 | Control | Dst Network Address | Src Network Address | Requested Channel ID | ACK_ID | Network ID |

As shown in Table 3, the format of the join request packet includes the following data fields:
Dst (destination) Network Address
The neighbor's network address
Src (source) BT (Bluetooth) Address
Local device network address.
Channel ID
The channel ID that a local device plans to use.
ACK_ID
At the join stage, the ACK_ID is the same in the join request and the report command.
Network ID
The Network ID field represents the level of a local device (e.g., the ID number of the local device) in the wireless mesh network 200.

Table 4 shows an example of a Join Response packet, which is used to answer the join request.

TABLE 4

Join Response Packet

| Octets: 1 Byte | 1 | 1 | 1 | 1 | 1 | 3 |
|---|---|---|---|---|---|---|
| opcode = 0x03 | Control | Dst Network Address | Src Network Address | Status | Channel ID | Network ID |

As shown in Table 4, the format of the Join Response packet includes the following data fields:
Dst Network Address
Destination address, which is the source address in the join request.
Src BT Address
Local device network address.
Status
Status information of the local device
Channel ID
The channel ID of Local device
Network ID
The Network ID field represents network ID number of local device in the wireless mesh network 200.

Table 5 shows an example of a Leave Notify packet, which is used by a wireless communications device 202 to inform other devices in the wireless mesh network 200 that the wireless communications device cannot hear other devices (i.e., cannot receive signals from other devices).

TABLE 5

Leave Notify Packet

| Octets: 1 Byte | 1 | 1 |
|---|---|---|
| opcode = 0x04 | Dst Network Address | Src Network Address |

As shown in Table 5, the format of the Leave Notify packet includes the following data fields:
Dst Network Address
Destination address, which is the source address in a join request.
Src BT Address
Local device network address.

Table 6 shows an example of a Status Code packet.

TABLE 6

Status Code packet

| Value | Description |
|---|---|
| 0x00 | Operation Success |
| 0x01 | |
| 0x02 | |

As shown in Table 6, a Status Code packet includes an Operation Success section that describes the status of an operation of a wireless communications device 202 in the wireless mesh network 200.

Figure 10:
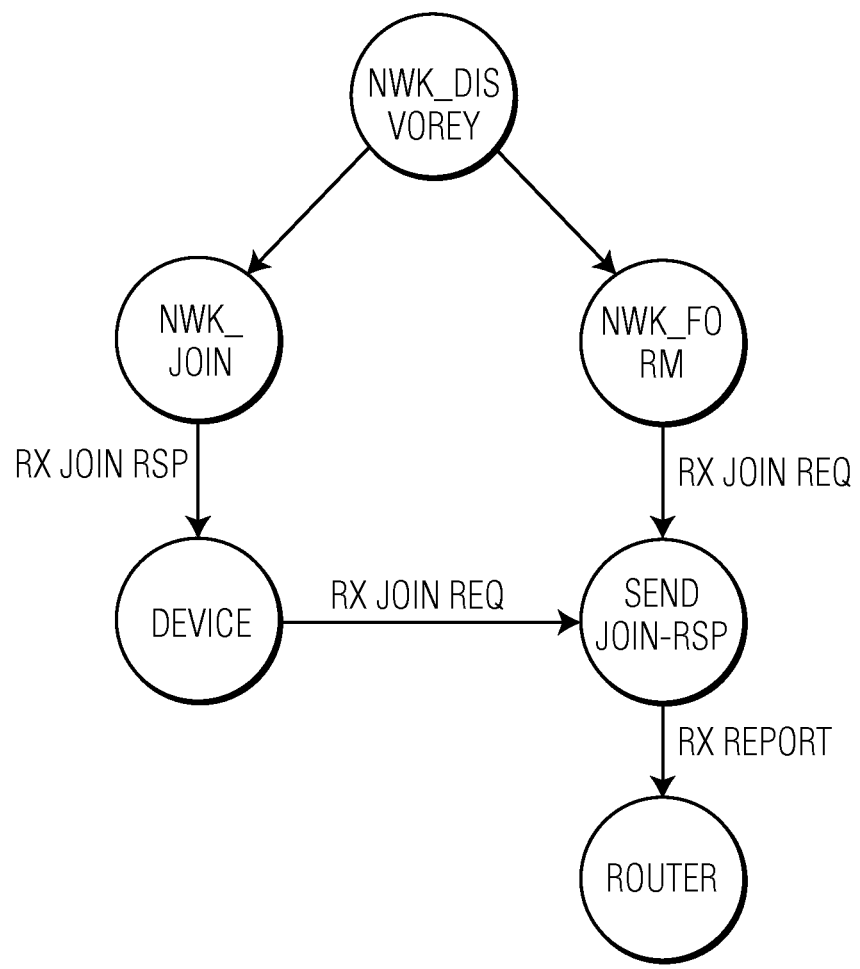
FIG. 10 shows a state graph for a wireless communications device in the wireless mesh network depicted in FIG. 2.

FIG. 10 shows a state graph for a wireless communications device 202 in the wireless mesh network 200. As shown in FIG. 10, the state graph includes the following processes:

NWK_DISCOVERY—At the discovery stage, a wireless communications device scans for other devices within its communications range.

NWK_JOIN—If the wireless mesh network is not full, the wireless communications device will join the wireless mesh network.

NWK_FORM—If no wireless mesh network is detected, the wireless communications device forms a wireless mesh network.

SEND_JOIN_REQ—If the wireless mesh network is full, the wireless communications device will join a subnetwork.

SEND_JOIN_RSP—A Router receives a join request and responds to this join request.

DEVICE—A join response has been received.

ROUTER—Device has been received, Report Command from end-device.

The wireless mesh network 200 can use various routing protocols. In an embodiment, the wireless mesh network uses an Ad hoc On Demand Distance Vector (AODV) Routing Protocol.

Figure 11:
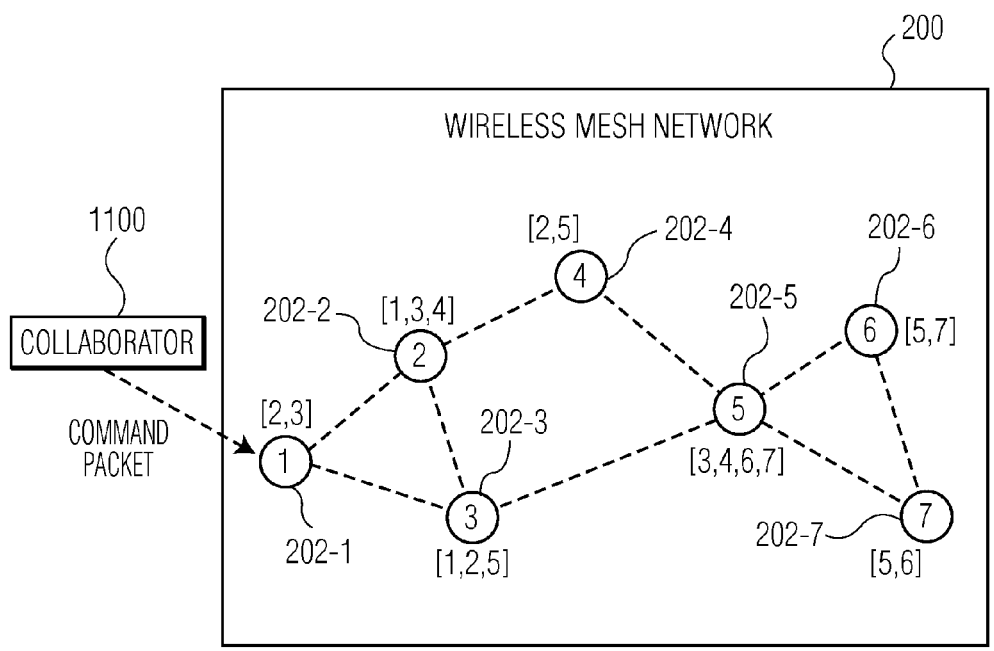
FIG. 11 shows a collaborator and the wireless mesh network depicted in FIG. 2 to which the collaborator sends a command packet.

Usually a data transmission within the wireless mesh network 200 is started by a command from a collaborator. FIG. 11 shows a collaborator 1100 and the wireless mesh network 200 to which the collaborator sends a command packet. The collaborator can join the wireless mesh network similarly as a node in the wireless mesh network. However, the collaborator does not handle routing messages or join requests. The collaborator sends commands to one or a group of devices of the wireless mesh network. The communication device/node 202-1, which is associated with the collaborator, acts as an agent to handle the routing process. If an existing routing path is not found, the node 202-1 will activate a routing process to create a new routing path and send the command packet to the destination.

An example of a command packet passed between two Network Layer entities on peer devices is described as follows. All commands can be sent in the Mesh layer 102. The Network frame format includes a control header and an application payload. The frame control field can be formatted as illustrated in Table 7.

Frame Control

TABLE 7

| Frame Control Field | | | | | |
|---|---|---|---|---|---|
| bit: 0 | 1-2 | 3 | 4-5 | 6 | 7 |
| Valid | Frame type | Broadcast Flag | Object type | Reserved | Reserved |

The fields shown are:

Valid (1 Bit)

| Value | Description |
|---|---|
| 0 | Frame invalid |
| 1 | Valid |

Frame Type (2 Bits)

| Value | Description |
|---|---|
| 0 | Routing request |
| 1 | Routing response |

Broadcast Flag (1 Bit)

| Value | Description |
|---|---|
| 0 | Unicast |
| 1 | Broadcast |

Object Type (2 Bits)

| Value | Description |
|---|---|
| 0 | Dest ID |
| 1 | Group ID |

An example of a routing request command is shown in Table 8. The routing request command allows a wireless communications device 202 to request other wireless communications devices to engage in a search for a particular destination device and to establish a state within the wireless mesh network 202 that will allow messages to be routed to that destination more easily and economically in the future.

TABLE 8

| Routing Request Packet | | | | | | | |
|---|---|---|---|---|---|---|---|
| Byte 0 | 1 | 2 | 3 | 4 | 5 | 6 | Var |
| Frame Control | Next hop Addr | Sequence number | Source ID | Dest ID/ Group ID | Hop info | Data length | Data |

The data fields are:

Next hop addr (1 Byte)

The next hop address is 1 byte in length and represents the network address of next hop on the way to the destination Sequence number (1 Byte)

The route request sequence number is an 8-bit sequence number for route requests and is incremented by two every time the network layer on a particular device issues a route request.

Source ID (1 Byte)

The source ID (e.g., source address) represents the intended source of the route request command frame.

Destination ID (1 Byte)

The destination ID (e.g., destination address) represents the intended destination of the route request command frame.

Hop info (1 Byte)

The Hop info includes a hop count and a time-to-live (TTL) value. The hop count is the least significant 4 bits and TTL is the most significant 4 bits.

Data Length (1 Byte)

The data payload length

Data

The data payload field shall contain the sequence of octets that the application layer has requested the network layer to transmit.

An example of a routing response command is shown in Table 9. The routing response command allows the specified destination device of a route request command to inform the originator of the route request that the request has been received.

TABLE 9

Routing Response Packet

| Byte 0 | 1 | 2 | 3 | 4 | 5 | 6 | Var |
|---|---|---|---|---|---|---|---|
| Frame Control | Next hop Addr | Sequence number | Source ID | Dest ID | Hop count | Data length | Data |

The data fields are:
  Next hop addr (1 Byte)
The next hop address is octet in length and represents the network address of next hop on the way to the destination
  Sequence number (1 Byte)
The route request sequence number is the sequence number plus 1 in route requests.
  Source ID (1 Byte)
The source ID (e.g., source address) represents the intended source of the route response command frame.
  Destination ID (1 Byte)
The destination ID (e.g., destination address) represents the intended destination of the route response command frame.
  Hop Count (1 Byte)
The hop count is the least significant 4 bits.
  Data Length (1 Byte)
The data payload length
  Data
The data payload field shall contain the sequence of octets that the application layer has requested the network layer to transmit.

Figure 12:
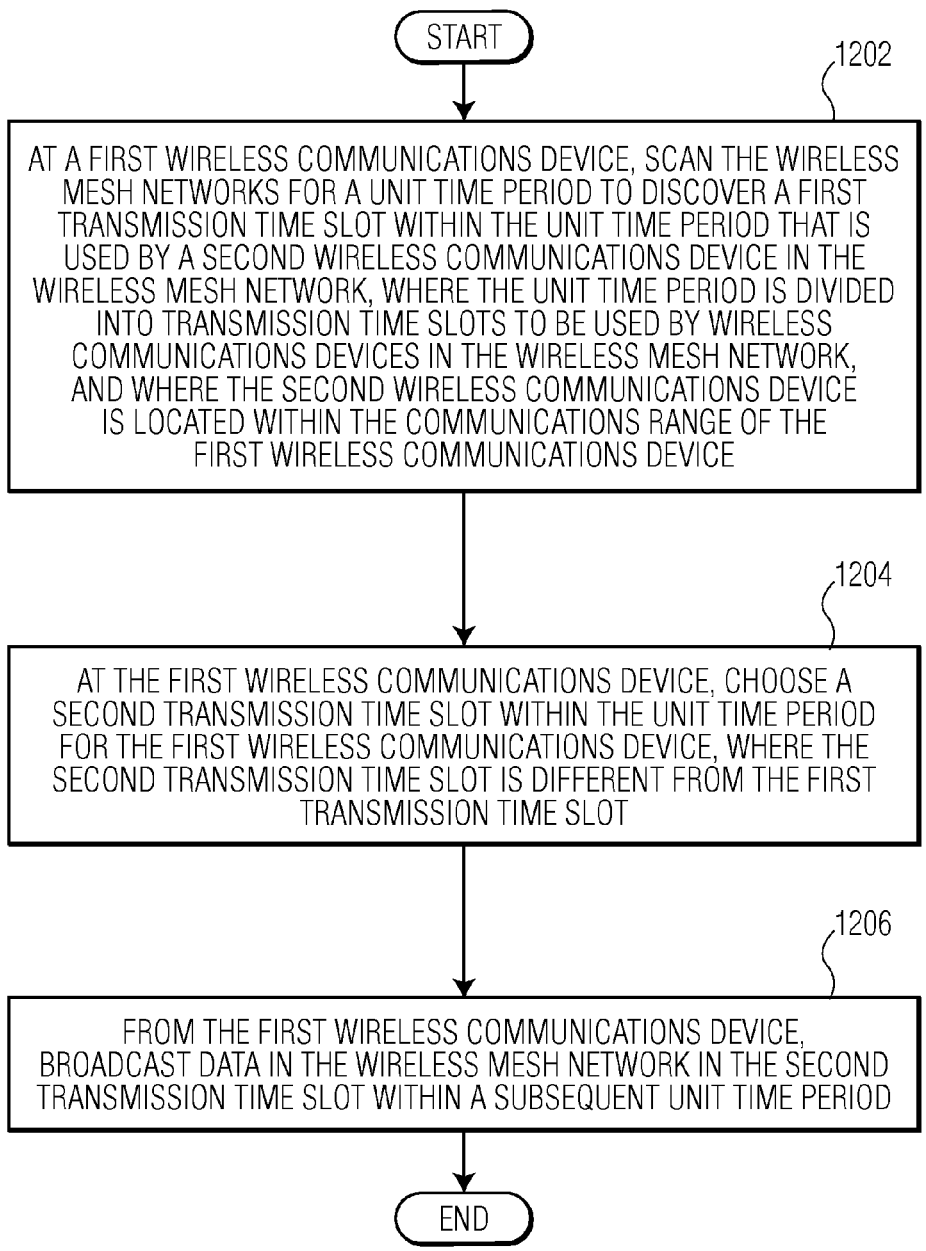
FIG. 12 is a process flow diagram of a method for communicating in a wireless mesh network in accordance with an embodiment of the invention.

FIG. 12 is a process flow diagram of a method for communicating in a wireless mesh network in accordance with an embodiment of the invention. At block 1202, at a first wireless communications device, the wireless mesh network is scanned for a unit time period to discover a first transmission time slot within each unit time period that is used by a second wireless communications device in the wireless mesh network, where each unit time period is divided into transmission time slots to be used by wireless communications devices in the wireless mesh network, and where the second wireless communications device is located within the communications range of the first wireless communications device. At block 1204, at the first wireless communications device, a second transmission time slot within each unit time period is chosen for the first wireless communications device, where the second transmission time slot is different from the first transmission time slot. At block 1206, from the first wireless communications device, data is broadcasted in the wireless mesh network in the second transmission time slot within a subsequent unit time period. The first and second wireless communications devices may be similar to or the same as the wireless communications devices 202, 402 depicted in FIGS. 2 and 4. The wireless mesh network may be similar to or the same as the wireless mesh network 200 depicted in FIG. 2.

Figure 13:
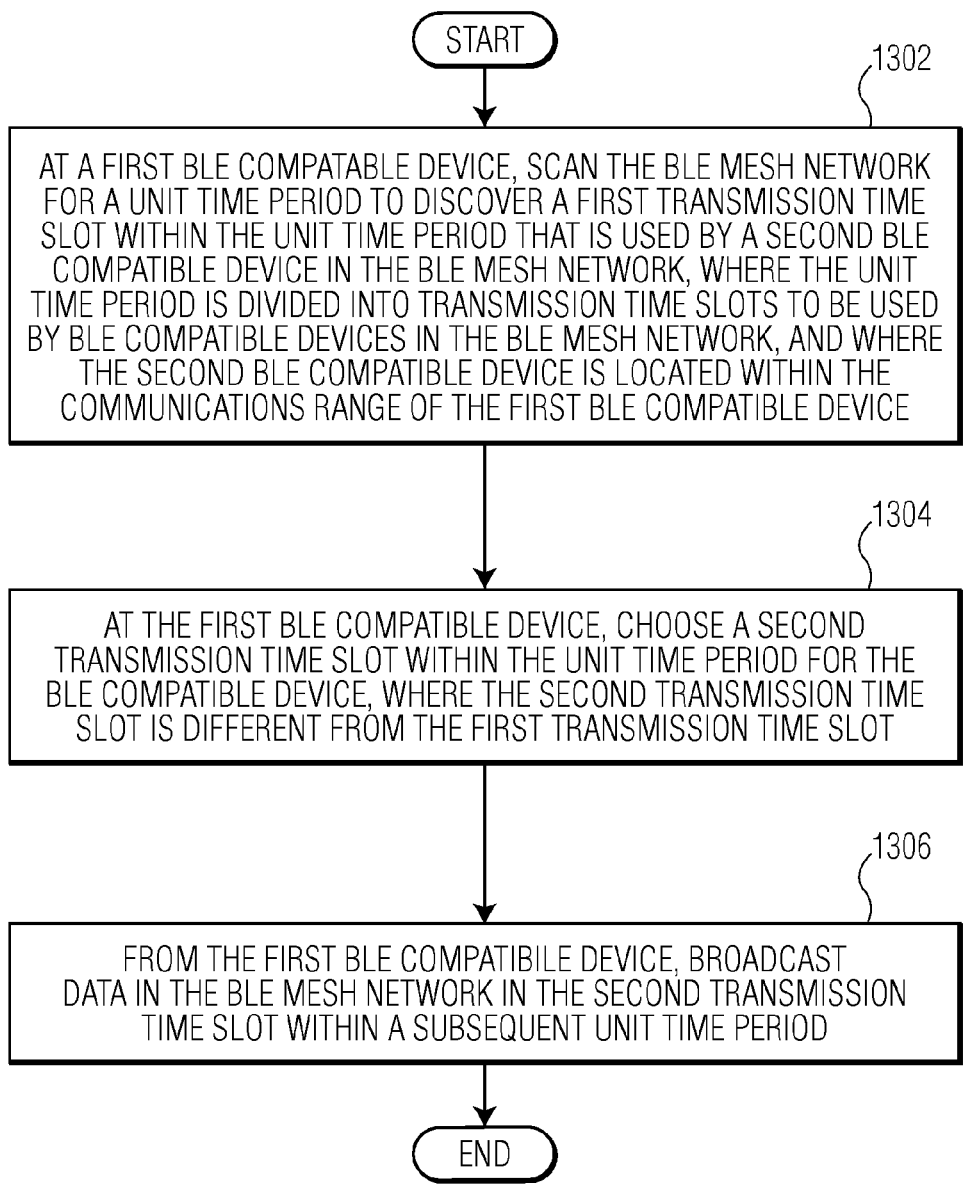
FIG. 13 is a process flow diagram of a method for communicating in a BLE mesh network in accordance with an embodiment of the invention.

FIG. 13 is a process flow diagram of a method for communicating in a Bluetooth Low Energy (BLE) mesh network in accordance with an embodiment of the invention. At block 1302, at a first BLE compatible device, the BLE mesh network is scanned for a unit time period to discover a first transmission time slot within each unit time period that is used by a second BLE compatible device in the BLE mesh network, where each unit time period is divided into transmission time slots to be used by BLE compatible devices in the BLE mesh network, and where the second BLE compatible device is located within the communications range of the first BLE compatible device. At block 1304, at the first BLE compatible device, a second transmission time slot within each unit time period is chosen for the BLE compatible device, where the second transmission time slot is different from the first transmission time slot. At block 1306, from the first BLE compatible device, data is broadcasted in the BLE mesh network in the second transmission time slot within a subsequent unit time period. The first and second BLE compatible devices may be similar to or the same as the wireless communications devices 202, 402 depicted in FIGS. 2 and 4. The BLE mesh network may be similar to or the same as the wireless mesh network 200 depicted in FIG. 2.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing computer executable instructions, or program code, for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for communicating in a wireless mesh network, the method comprising:
  at a first wireless communications device, scanning the wireless mesh network for a unit time period to discover a first transmission time slot within the unit time period that is used by a second wireless communications device in the wireless mesh network, wherein the unit time period is divided into a plurality of transmission time slots to be used by a plurality of wireless communications devices in the wireless mesh network, and wherein the second wireless communications device is located within the communications range of the first wireless communications device;

at the first wireless communications device, choosing a second transmission time slot within the unit time period for the first wireless communications device, wherein the second transmission time slot is different from the first transmission time slot and receiving a confirmation message from the second wireless communication device in the first transmission time slot within a second subsequent unit time period that confirms the usage of the second transmission time slot by the first wireless communications device, before broadcasting the data in the wireless mesh network from the first wireless communications device in the second transmission time slot within the subsequent unit time period; and from the first wireless communications device, broadcasting data in the wireless mesh network in the second transmission time slot within a subsequent unit time period.

2. The method of claim 1, further comprising, from the first wireless communications device, transmitting a request to join the wireless mesh network to the second wireless communications device in a transmission time slot reserved for joining the wireless mesh network or the second transmission time slot within a second subsequent unit time period, before broadcasting data in the wireless mesh network from the first wireless communications device in the second transmission time slot within the subsequent unit time period.

3. The method of claim 1, further comprising:
at the first wireless communications device, choosing a third transmission time slot within each unit time period for the first wireless communications device before choosing the second transmission time slot within each unit time period for the first wireless communications device, wherein the third transmission time slot is different from the first and second transmission time slots; and at the first wireless communications device, receiving a message from the second wireless communications device in the first transmission time slot within a second subsequent unit time period that objects to the usage of the third transmission time slot by the first wireless communications device.

4. The method of claim 1, wherein, at the first wireless communications device, scanning the wireless mesh network for the unit time period, comprises, at the first wireless communications device, creating a neighbor table that identifies the second wireless communications device and the first transmission time slot that is used by the second wireless communications device.

5. The method of claim 1, wherein, at the first wireless communications device, choosing the second transmission time slot within the unit time period for the first wireless communications device comprises, at the first wireless communications device, generating a random number that corresponds to a place of the second transmission time slot within each unit time period.

6. The method of claim 1, wherein, at the first wireless communications device, scanning the wireless mesh network for the unit time period, comprises, at the first wireless communications device, receiving signals in the wireless mesh network at a first frequency band, wherein, from the first wireless communications device, broadcasting data in the wireless mesh network, comprises, from the first wireless communications device, transmitting signals in the wireless mesh network in a second frequency band, and wherein the first frequency band does not overlap with the second frequency band.

7. The method of claim 1, further comprising:
at the first wireless communications device, receiving a data packet from the second wireless communications device in the first transmission time slot within a second subsequent unit time period; and from the first wireless communications device, transmitting the received data packet in the wireless mesh network in the second transmission time slot within the second subsequent unit time period or a third subsequent unit time period.

8. The method of claim 1, wherein the wireless mesh network is a peer-to-peer network.

9. A method for communicating in a Bluetooth Low Energy (BLE) mesh network, the method comprising:
at a first BLE compatible device, scanning the BLE mesh network for a unit time period to discover a first transmission time slot within the unit time period that is used by a second BLE compatible device in the BLE mesh network, wherein the unit time period is divided into a plurality of transmission time slots to be used by a plurality of BLE compatible devices in the BLE mesh network, and wherein the second BLE compatible device is located within the communications range of the first BLE compatible device;

at the first BLE compatible device, choosing a second transmission time slot within the unit time period for the BLE compatible device, wherein the second transmission time slot is different from the first transmission time slot and receiving a confirmation message from the second BLE compatible device in the first transmission time slot within a second subsequent unit time period that confirms the usage of the second transmission time slot by the first BLE compatible device, before broadcasting the data in the BLE mesh network from the first BLE compatible device in the second transmission time slot within the subsequent unit time period; and from the first BLE compatible device, broadcasting data in the BLE mesh network in the second transmission time slot within a subsequent unit time period.

10. The method of claim 9, further comprising, from the first BLE compatible device, transmitting a request to join the BLE mesh network to the second BLE compatible device in a transmission time slot reserved for joining the BLE mesh network or the second transmission time slot within a second subsequent unit time period, before broadcasting data in the BLE mesh network from the first BLE compatible device in the second transmission time slot within the subsequent unit time period.

11. The method of claim 9, further comprising:
at the first BLE compatible device, choosing a third transmission time slot within each unit time period for the first BLE compatible device before choosing the second transmission time slot within each unit time period for the first BLE compatible device, wherein the third transmission time slot is different from the first and second transmission time slots; and at the first BLE compatible device, receiving a message from the second BLE compatible device in the first transmission time slot within a second subsequent unit time period that objects to the usage of the third transmission time slot by the first BLE compatible device.

12. The method of claim 9, wherein, at the first BLE compatible device, scanning the BLE mesh network for the unit time period, comprises, at the first BLE compatible device, creating a neighbor table that identifies the second BLE compatible device and the first transmission time slot that is used by the second BLE compatible device.

13. The method of claim 9, wherein, at the first BLE compatible device, choosing the second transmission time slot within the unit time period for the first BLE compatible device comprises, at the first BLE compatible device, generating a random number that corresponds to a place of the second transmission time slot within each unit time period.

14. The method of claim 9, wherein, at the first BLE compatible device, scanning the BLE mesh network for the unit time period, comprises, at the first BLE compatible device, receiving signals in the BLE mesh network at a first frequency band, wherein, from the first BLE compatible device, broadcasting data in the BLE mesh network, comprises, from the first BLE compatible device, transmitting signals in the BLE mesh network in a second frequency band, and wherein the first frequency band does not overlap with the second frequency band.

15. The method of claim 9, further comprising:
at the first BLE compatible device, receiving a data packet from the second BLE compatible device in the first transmission time slot within a second subsequent unit time period; and
from the first BLE compatible device, transmitting the received data packet in the BLE mesh network in the second transmission time slot within the second subsequent unit time period or a third subsequent unit time period.

16. The method of claim 9, wherein the BLE mesh network is a peer-to-peer network.

17. A wireless communications device, the wireless communications device comprising:
an antenna module configured to receive radio frequency (RF) signals or transmit RF signal; and
a transceiver module configured to:
scan a wireless mesh network for a unit time period to discover a first transmission time slot within the unit time period that is used by a second wireless communications device in the wireless mesh network, wherein the unit time period is divided into a plurality of transmission time slots to be used by a plurality of wireless communications devices in the wireless mesh network, and wherein the second wireless communications device is located within the communications range of the wireless communications device;
choose a second transmission time slot within the unit time period for the wireless communications device, wherein the second transmission time slot is different from the first transmission time slot and receiving a confirmation message from the second wireless communications device in the first transmission time slot within a second subsequent unit time period that confirms the usage of the second transmission time slot by the first wireless communications device, before broadcasting the data in the wireless mesh network from the first wireless communications device in the second transmission time slot within the subsequent unit time period; and
broadcast data in the wireless mesh network in the second transmission time slot within a subsequent unit time period.

18. The wireless communications device of claim 17, wherein the transceiver module is further configured to transmit a request to join the wireless mesh network to the second wireless communications device in a transmission time slot reserved for joining the wireless mesh network or the second transmission time slot within a second subsequent unit time period.

* * * * *